United States Patent [19]

Hopwood

[11] Patent Number: 5,123,160
[45] Date of Patent: Jun. 23, 1992

[54] ALIGNMENT APPARATUS

[75] Inventor: Robert T. Hopwood, Cheltenham, United Kingdom

[73] Assignee: TBS Engineering Limited, Cheltenham, United Kingdom

[21] Appl. No.: 536,590

[22] Filed: Jun. 28, 1990

[30] Foreign Application Priority Data

Jan. 22, 1988 [GB] United Kingdom ............... 8801468
Nov. 19, 1988 [GB] United Kingdom ............... 8827077

[51] Int. Cl.$^5$ ............................................. B23P 19/00
[52] U.S. Cl. .................................... 29/730; 269/297; 269/304
[58] Field of Search ............ 29/730; 269/289 R, 296, 269/297, 304

[56] References Cited

U.S. PATENT DOCUMENTS

| | | | |
|---|---|---|---|
| 1,602,684 | 10/1926 | Lancaster | 269/304 |
| 2,628,992 | 2/1953 | Weideman | 29/730 |
| 2,981,393 | 4/1961 | Gunnison | 193/43 |
| 3,052,968 | 9/1962 | Kerns | 29/730 |
| 3,808,663 | 5/1974 | McLane | 29/730 X |
| 4,168,772 | 9/1979 | Eberle | 198/421 |
| 4,349,959 | 9/1982 | Urban | 29/730 |
| 4,415,149 | 11/1983 | Rees | 269/297 X |

FOREIGN PATENT DOCUMENTS

| | | |
|---|---|---|
| 1906020 | 9/1969 | Fed. Rep. of Germany . |
| 2526159 | 12/1976 | Fed. Rep. of Germany . |
| 1317259 | 2/1962 | France . |
| 84-04000 | 10/1984 | PCT Int'l Appl. . |
| 1371162 | 10/1974 | United Kingdom . |

OTHER PUBLICATIONS

Patent Abstracts of Japan, vol. 6, No. 170 (E-128) (1048) Sep. 3, 1982, Corresponds to Jap. 57-88677 (Ishida).
Patent Abstracts of Japan, vol. 10, No. 352 (E-458) (2408) Nov. 27, 1986, Corr. to Jap. 61-151973 (Iida).
Patent Abstracts of Japan, vol. 10, No. 1 (E-371) (2058) Jan. 7, 1986, Corr. to Jap. 60-165065 (Nakai).
Patent Abstracts of Japan, vol. 6, No. 42 (E-98) (920) Mar. 16, 1982, Corr. to Jap. 56-159070 (Takano).

Primary Examiner—Stephen Kalafut
Attorney, Agent, or Firm—Young & Thompson

[57] ABSTRACT

This invention relates to apparatus for aligning groups of plates and separators in a group for use in an accumulator battery and can more broadly relate to general alignment apparatus.

In one construction the alignment apparatus 19 has a table 20 which is mounted on a frame, which can be lifted by a hydraulic ram 21 and vibrated by a vertically acting low frequency vibrator 22 and a cyclically horizontally acting vibrator 23. A head 24 is provided with lug aligning walls, 25, 26 which align the plates 31, while walls 17 and 18 provide lateral alignment of the separators 30. Weights 27 and 27A act on top of the plates 31 and separators 30 respectively to provide vertical alignment. The combined vibrations produced by the vibrators 22, 23 free the plates and separators to allow these alignments to occur.

16 Claims, 5 Drawing Sheets

ALIGNMENT APPARATUS

This invention relates to apparatus for aligning groups of plates and separators in a group for use in an accumulator battery.

In most modern batteries the cells are filled with groups consisting of alternate lugged plates and microporous separators which are in general of greater dimensions than the plates, except the lugs stand clear of the whole group. Before they are inserted in their respective cells the lugs are subjected to a casting operation and it is essential for this and other manufacturing processes that the plates and separators are all correctly positioned within the group. There are a number of different machines for performing the casting operation prior to the loading of the groups into the battery cells and one example is the machine described in our co-pending application No. 8714926, the disclosure of which is incorporated into this application. Such machines generally support the groups in carriers in which they are transferred from one work station to another. Before the groups are locked into the carrier, they are manually loaded by an operator who has had to spend some time ensuring that the plates and separators are in a neat stack and subsequent to loading he aligns the lugs of the plates. This is not only a slow operation but it requires the carrier width to be only slightly greater than that of the groups and this further slows the loading operation. The result is that the loading time can be significantly greater than any of the other steps in the cycle of the machine and hence it dictates the machine's total cycle time.

The present invention consists in apparatus for aligning plates bearing lugs and separators in a group for an accumulator battery, comprising support means for vibrating the plates and separators so that they move freely with respect to one another, means for engaging a side of the vibrating separators to move them into alignment, means for engaging the vibrating plates to bring them into alignment and means for urging the plates and separators against the support means.

In a preferred embodiment, the support means includes a support, for example a table, and means for inducing vibration of the support. The vibrating means may induce at least a vertical vibration of the support and it has been found that relatively low frequency vibration is particularly suitable for obtaining satisfactory movement of the separators. Preferably, the vibrating means also induces at least a generally horizontal vibration of the support, which may include a generally circular motion of the support. This horizontal vibration is preferably a relatively high frequency vibration as that is particularly effective in freeing the plates for movement.

The means for urging the plates and the separators against the support may include one or more weights engageable with their top edges. Conveniently, there may be a weight for acting on the separators and a further weight for each set of plate lugs.

The apparatus may further include a datum wall to provide a lateral position for the separators and the means for engaging the separators may be constituted by a further wall parallel to and moveable towards and away from the datum wall. Alternatively both walls may be moveable or they may both be fixed. The walls may thus be constituted by the walls of a carrier for the battery groups and this has the additional advantage that their separation may be greater than normal at the loading, and indeed the unloading, stage allowing for much easier handling of the groups. The carrier has the means for clamping the groups therein, generally acting along an axis extending between the two walls.

The means for engaging the plates may include a pair of spaced relatively moveable walls for each set of lugs for engaging the lugs by inward relative movement. Preferably the walls, in a pair, are outwardly and downwardly inclined with respect to each other, and conveniently the lug weights may extend between the walls. Alternatively they may be parallel to the walls or inward thereof.

The apparatus may further include means for moving the support means towards and away from the position in which the groups are aligned and may further include means for moving the lug alignment means towards and away from that position.

With certain types of plates it has been found that during the alignment procedure they can fall over into a tilted position and the vibrations of the support are insufficient to right the plate.

Accordingly the support means above may comprise a pair of independent supports for supporting respective sides of the plates and means for moving the supports in a sense such that they act, on their respective sides, in opposed directions.

Thus the supports may be configured as vibrating conveyors directed in immediately opposite senses. The supports may form respective halves of a longitudinally split table.

From a further aspect the invention consists in alignment apparatus for aligning a stack of articles, comprising a split support for supporting respective sides of one edge of the stack and means for moving the two parts of the support in a sense that they act on their respective sides in opposed directions.

The invention further consists in a machine for use in the manufacture of plates for accumulator batteries including the apparatus as defined above. Where the machine includes a brushing and fluxing station, as in 8714926, the apparatus can conveniently be located at the brushing and fluxing station because that operation takes relatively little cycle time.

Although the invention has been defined above, it is to be understood that it includes any inventive combination of the features set out above or in the following description.

The invention may be performed in various ways, and specific embodiments will now be described, by way of example, with reference to the accompanying drawings, in which.

Figure 1:
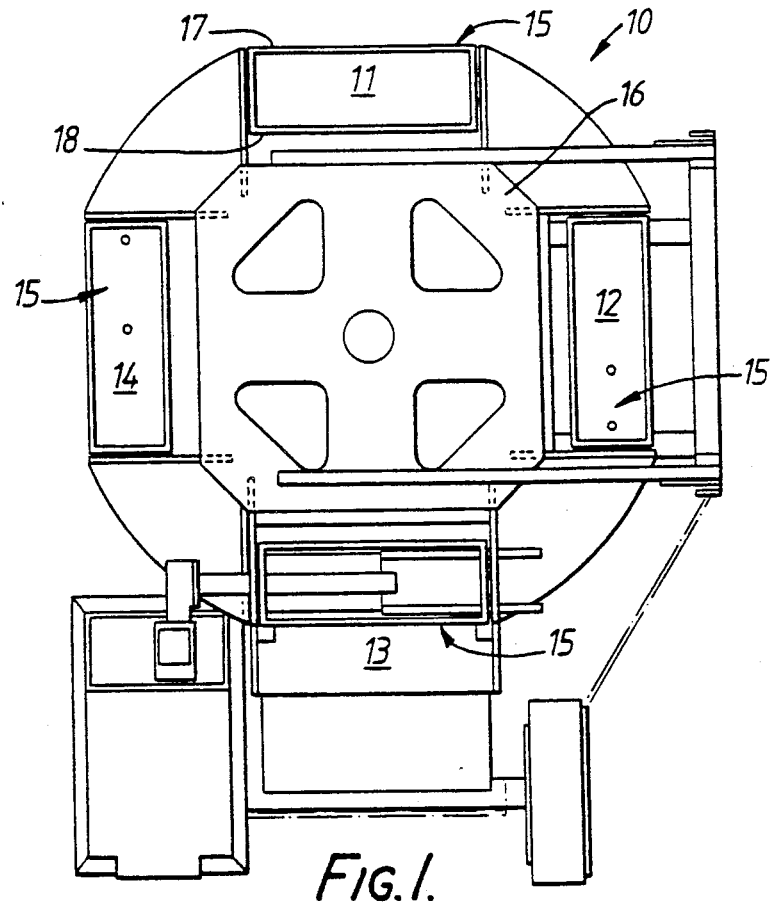
FIG. 1 is a plan view of a machine for use in the manufacture of plates for accumulator batteries.

Referring to FIG. 1, a machine for casting straps on groups of battery plates and separators is generally indicated at 10. The machine has a loading station 11, a brush and flux station 12, a casting station 13 and an unloading station 14. Carriers 15 for groups of plates and separators are mounted around the periphery of a table 16 and can be moved on the table successively through the stations 11 to 14.

Figure 2:
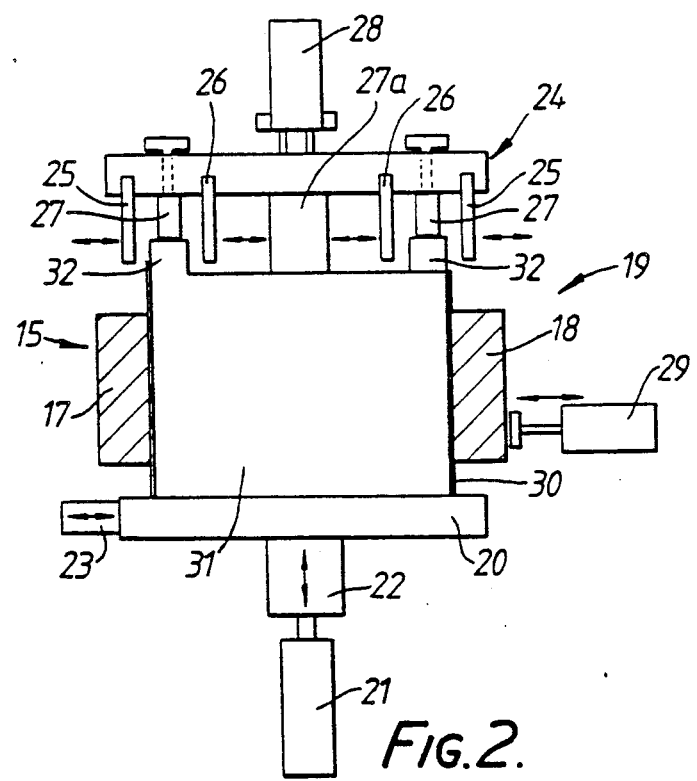
FIG. 2 is a schematic end view of apparatus for aligning plates bearing lugs and separators in a group.

For the apparatus, which will be described below, it is proposed that one wall 17 should be fixed to define a datum for the sides of the plates and separators whereas the opposite wall 18 should be sprung-loaded into an outer position and mounted so that it is moveable towards the datum wall. With the wide separation thus available, the operator at the loading station 11 can pick up groups of plates and separators and load them into the carrier 15 without being greatly concerned with their relative positions. The table 16 is then carried to the brushing and fluxing station 12 at which is located alignment apparatus 19 (see FIG. 2).

This apparatus 19 has a table 20, which is mounted on a frame which is lifted by an hydraulic ram 21, to isolate the table from the rest of the machine, and a vertically-acting low frequency vibrator 22. A further cyclically horizontally acting vibrator 23 is also engaged on the table. Positioned above the table and spaced therefrom is a head 24, which carries pairs of lug aligning walls 25, 26 which, in each pair, can be moved toward each other. In between the walls is a freely mounted weight 27 and a further such weight 27a depends in the centre of the head 24. Alternatively there may be two weights adjacent the edges of the plate. The head 24 is mounted on a ram 28 or other lifting apparatus for movement towards and away from the table 20. The apparatus also includes the carrier 15 and ram 29 which is positioned to move the wall 18 of the carrier inwardly.

Figure 3:
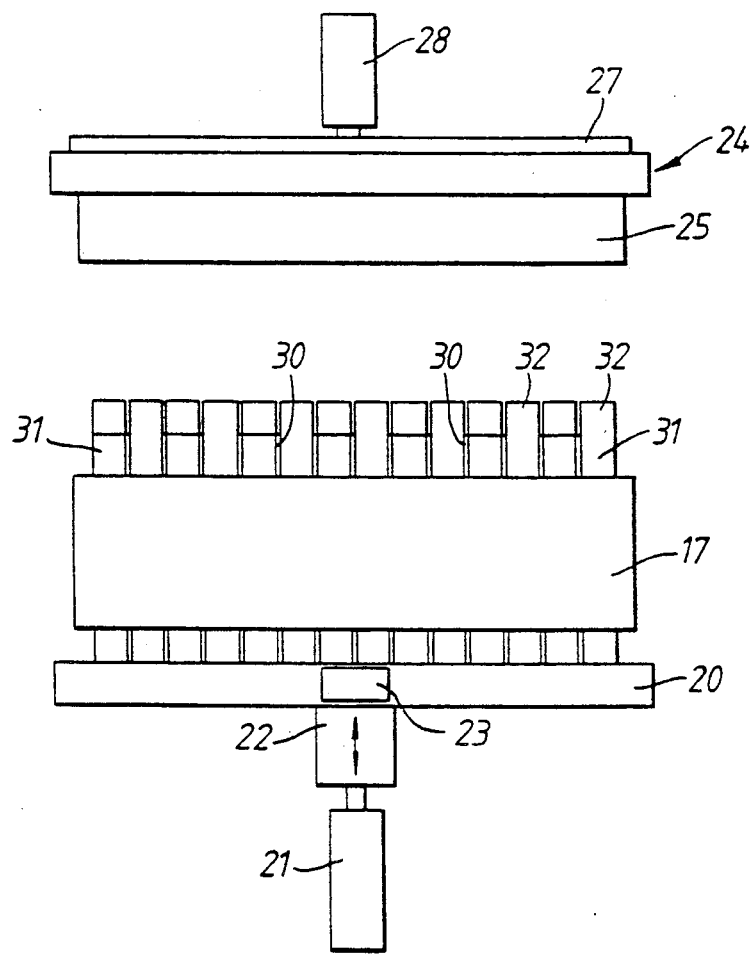
FIG. 3 is a side view of the apparatus of FIG. 2 with its alignment head raised.

In use, the carrier 15 brings plates 31 and interdigited separators 30 to the alignment apparatus 19. As has been explained above, the plates and separators have not been aligned at this stage. When the carrier 15 arrives in the position indicated in FIGS. 2 & 3, the table 20 moves upwardly to engage the group of separators 30 and plates 31, whereupon the clamp (not shown) on the carrier 15 is released. The table 20 is vibrated by the vibrators 22 and 23 and it has been found that a combination of low frequency vertical vibration and high frequency circular horizontal vibration frees the stack of plates and separators in the group for relative movement. The ram 29 then urges the wall 18 inwardly to push the edges of the separators 30 against the datum wall 17 establishing their lateral aligned position. Immediately afterwards, the head 24 is lowered so that the weights 27 and 27a engage the plates 31 and separators 30 respectively pushing them firmly down on the table 20 establishing a vertically aligned position for both plates and separators. The walls 25, 26 are then moved towards each other to engage the upstanding lugs 32 on the plates 31 and hence drawing the plates 31 into alignment. The group is therefore aligned in all directions and it is then re-clamped by the carrier 15 and the table 20 and head 24 move away from the carrier 15 to allow it to rotate for the brushing and fluxing operation.

Figure 4:
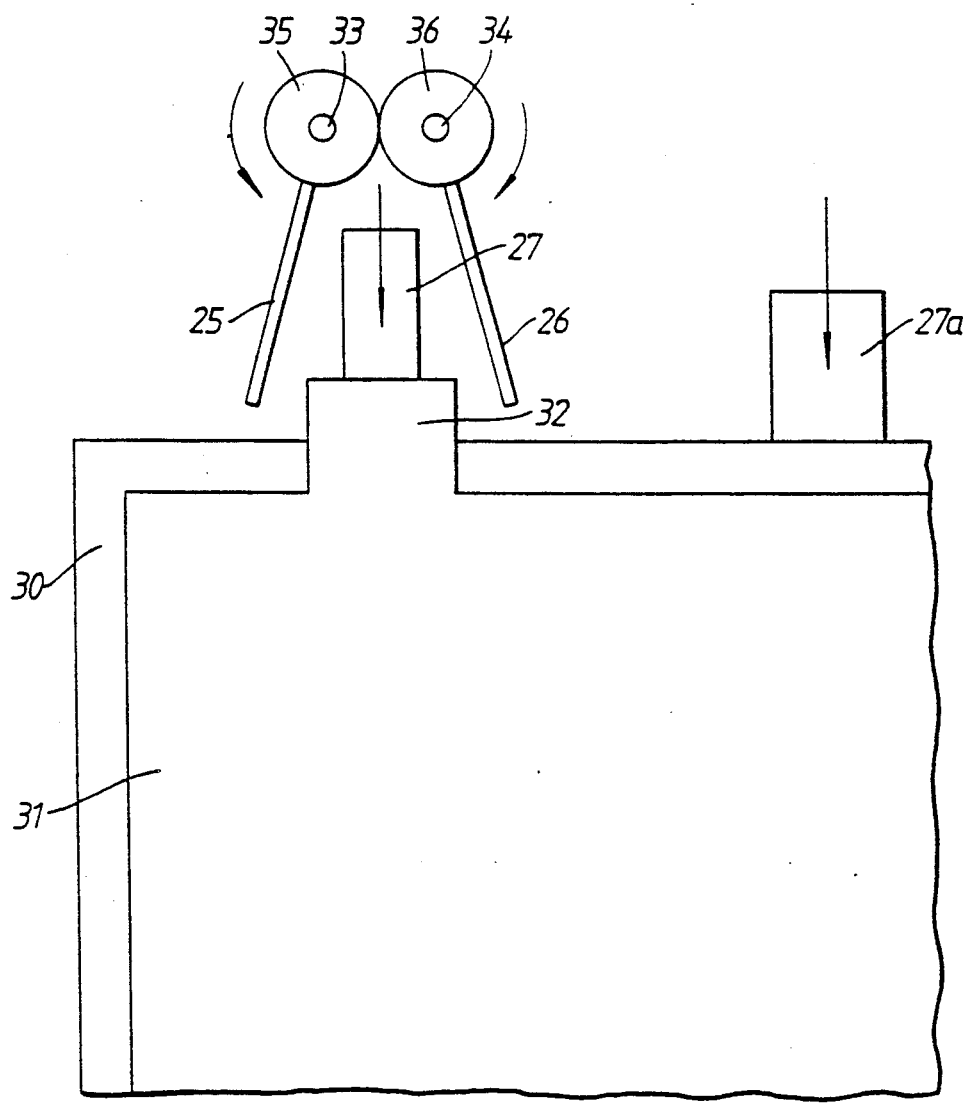
FIG. 4 is an enlarged scrap end view showing an alternative embodiment of that head.

As can be seen in FIG. 4, the walls 25 and 26 may be conveniently mounted on shafts 33, 34 bearing inter-engaging cog wheels 35,36 so that a rotation of one of the shafts causes either inward or outward movement of the walls. Conveniently, the walls diverge downwardly so that they will engage the sides of even significantly misaligned lugs without becoming jammed on top of the lugs.

Figure 5:
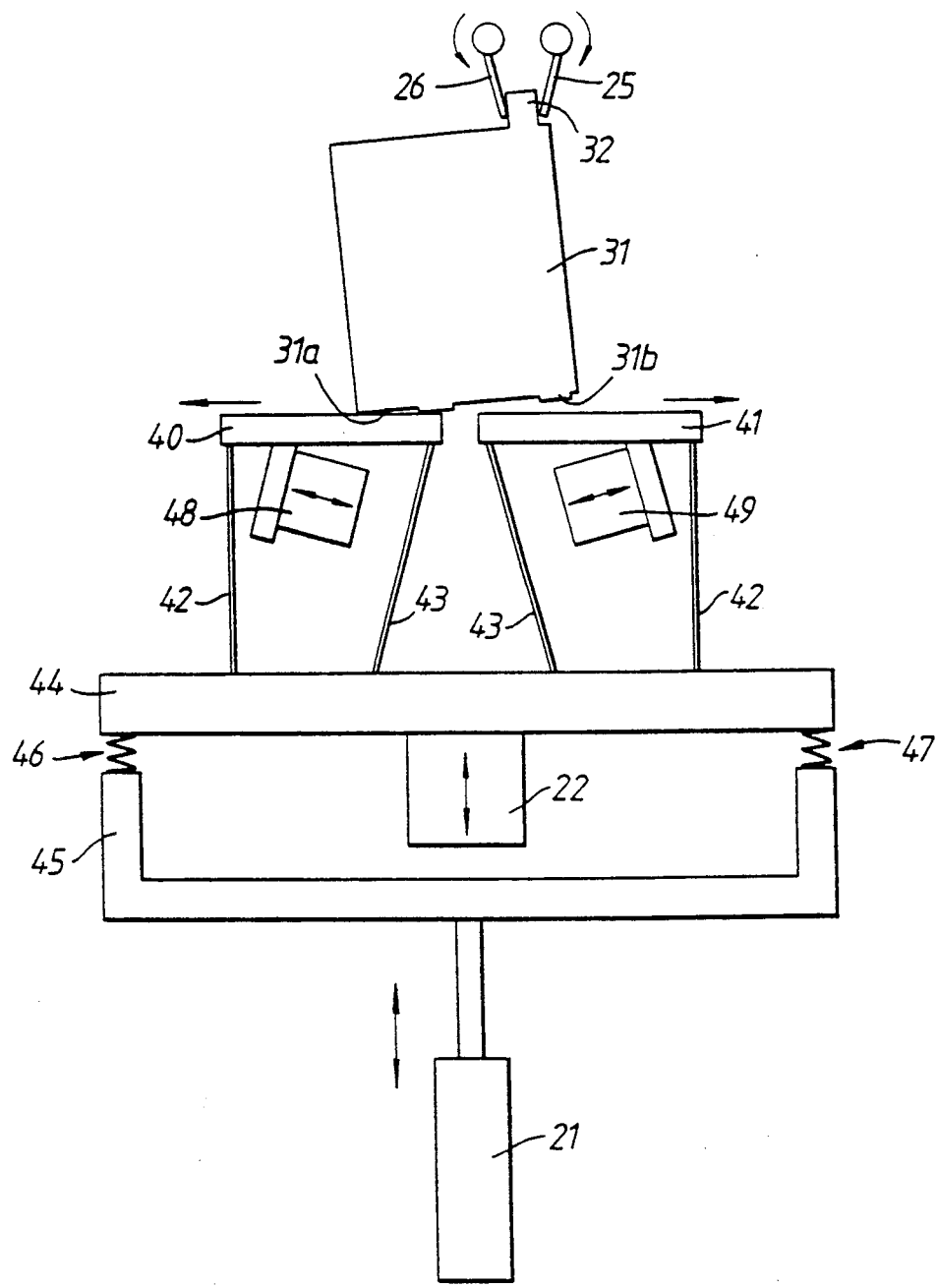
FIG. 5 is the end view of an alternative construction of an apparatus for aligning plates.
Figure 6:
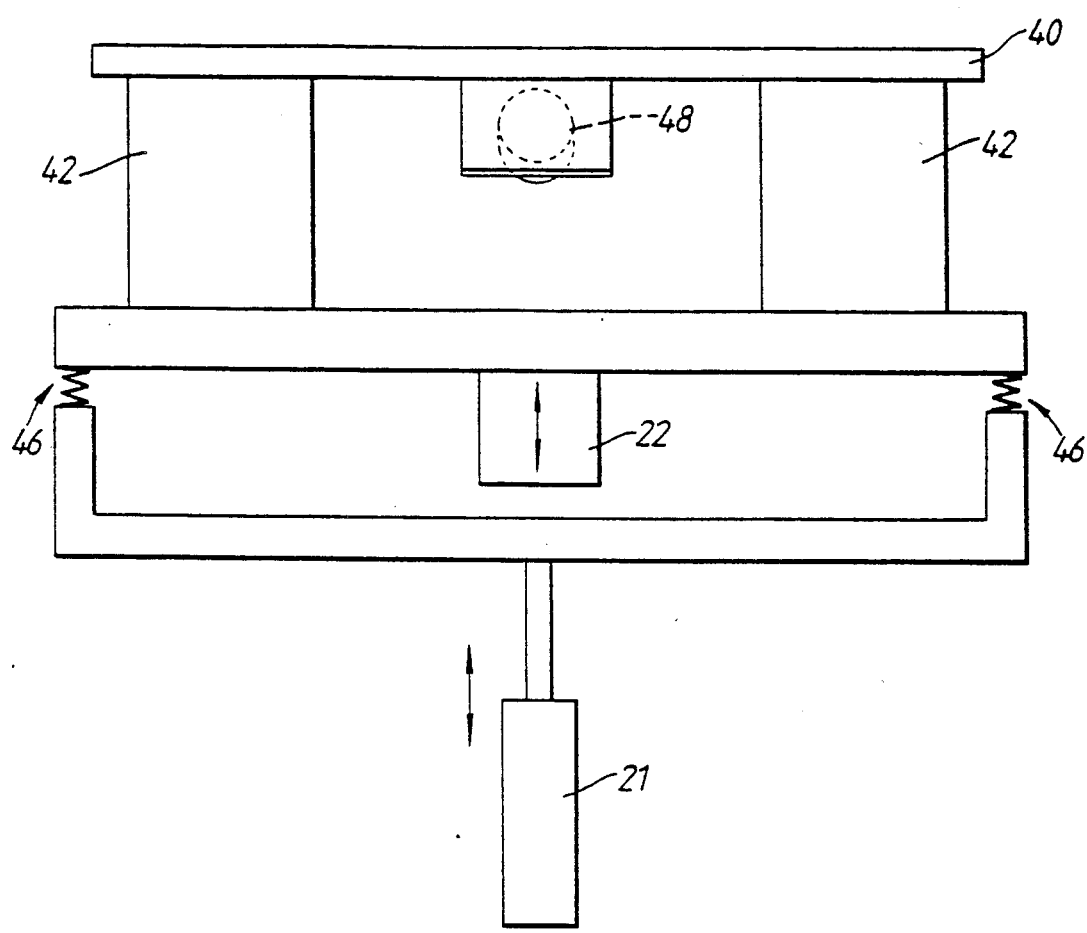
FIG. 6 is a side view of the apparatus of FIG. 5.

Turning to FIGS. 5 and 6 the support 20 is divided into two halves 40 and 41 each of which are supported by leaf springs 42 and 43 on a base plate which is in turn mounted on a subframe 45 by antivibrating mountings 46 and 47. The whole assembly can be moved vertically by piston 21. As before the low frequency vibrations are induced by a piston vibratory which acts, in this case, on the base plate 44.

It will be seen that the outer leaf springs 42 are vertical in each case, but springs 43 are each inwardly inclined. This means that when the respective support sections 40, 41 are vibrated by their respective linear vibrators 48, 49 they act as vibrating conveyors and hence tend to drive anything on their surfaces outwardly as shown by the arrows in the figure.

Thus if when a lug 32 is engaged by lug aligning walls 25, 26 (which in this construction rotate into engagement), the plate 31 tilts over to the position shown in FIG. 5, its corner 31a is dragged in a leftward direction until the foot 31b lands on the table 41. In this position the plate 31 is now standing equally on the supports 40 and 41 and the respective driving forces cancel out.

It has been found that this high frequency vibration is an adequate substitute for the circular vibration mentioned previously as well as having the advantage of overcoming the problem of tilting plates.

It will be understood that this split support system may be applicable in other manufacturing processes where goods can be received in a tilted condition.

It will be seen that the invention can be used to align stacks of other elements having similar characteristics and such apparatus is included in the scope of the invention.

The apparatus may be particularly advantageous if automatic loading of the carrier takes place, because it removes the need for accurate alignment at that stage.

Where the alternate plates are contained with in separator envelopes it may be necessary to push them into alignment against a fixed datum using lateral pressure e.g. from a movable wall.

I claim:

1. Apparatus for aligning plates, bearing lugs and separators arranged in a group for an accumulator battery, comprising support means for vibrating the plates and separators so that they move freely with respect to one another and including a pair of independent supports for supporting respective sides of the bottom edges of the plates and means for moving the supports in a sense such that they act on the sides of the bottom edges of the plates, which they respectively support, in opposed directions; means for engaging a side of the vibrating separators to move then into alignment; means for engaging the vibrating plates to bring them into alignment and means for urging the plates and separators against the support means.

2. Apparatus as claimed in claim 1 wherein the support means includes a support, and means for inducing vibration of the support.

3. Apparatus as claimed in claim 2 wherein the vibrating means induce at least a vertical vibration of the support.

4. Apparatus as claimed in claim 1 claims wherein the vibrating means induces horizontal vibration.

5. Apparatus as claimed in claim 4 wherein the horizontal vibration is generally circular.

6. A machine for use in the manufacture of accumulator batteries or parts thereof including apparatus as claimed in claim 1.

7. Apparatus as claimed in claim 1 further including means for moving the support means towards and away from an operative position in which the groups are aligned.

8. Apparatus as claimed in claim 1 wherein the supports are configured as respective vibrating conveyors directed in immediately opposite senses.

9. Apparatus as claimed in claim 8 wherein the supports form respective halves of a longitudinally split table.

10. Apparatus as claimed in claim 1 wherein the means for urging the plates and the separators against the support include one or more weights engageable with their top edges.

11. Apparatus as claimed in claim 1 wherein there is a weight for acting on the separators and a further weight for each set of plate lugs.

12. Apparatus as claimed in claim 1 further including a datum wall to provide a lateral position for the separators and the means for engaging the separators may be constituted by a further wall parallel to and moveable towards and away from the datum wall.

13. Apparatus as claimed in claim 12 wherein the datum wall is moveable.

14. Apparatus as claimed in claim 1 wherein the means for engaging the separators comprises a fixed wall.

15. Apparatus as claimed in claim 1 wherein the plate engaging means include a pair of spaced relatively moveable walls for each set of lugs for engaging the lugs by inward relative movement.

16. Apparatus as claimed in claim 1 further including means for moving the lug alignment means towards and away from that position.

* * * * *